United States Patent [19]

Kachel et al.

[11] Patent Number: 4,895,102
[45] Date of Patent: Jan. 23, 1990

[54] SPIN COATER

[75] Inventors: Theodore V. Kachel, Pittsburgh, Pa.; Clarence F. Rydeen, Ramona; Robert W. Millar, San Diego; Ralph C. Dawson, Carlsbad; Robert L. Griffith, Vista; William H. Weitzel, Lakeside, all of Calif.

[73] Assignee: Techna Vision Incorporated, Santee, Calif.

[21] Appl. No.: 113,965

[22] Filed: Oct. 29, 1987

[51] Int. Cl.⁴ .................... B05C 11/00; B05C 1/02
[52] U.S. Cl. ................................ 118/620; 118/52
[58] Field of Search ................ 118/620, 52, 53, 641

[56] References Cited

U.S. PATENT DOCUMENTS

| | | | |
|---|---|---|---|
| 2,193,742 | 3/1940 | Rohm et al. | 351/159 |
| 2,542,386 | 2/1941 | Beattie | 264/2.3 |
| 2,964,501 | 12/1930 | Sarofeen | 425/808 |
| 3,070,846 | 1/1963 | Schrier | 425/808 |
| 3,426,727 | 2/1969 | Balain et al. | 279/3 |
| 3,444,326 | 2/1970 | Upton | 118/52 |
| 3,538,883 | 11/1970 | Polin | 118/52 |
| 3,794,314 | 2/1974 | Coburn et al. | 279/3 |
| 3,968,305 | 7/1976 | Oshima et al. | 264/25 |
| 3,971,872 | 7/1976 | LeBoeuf | 425/812 |
| 3,978,178 | 8/1976 | Oshima et al. | 264/25 |
| 4,164,099 | 8/1979 | Grant | 279/3 |
| 4,251,474 | 2/1981 | Blandin | 425/508 |
| 4,315,705 | 2/1982 | Flint | 118/52 |
| 4,347,302 | 8/1982 | Gotman | 427/240 |
| 4,357,006 | 11/1982 | Hayes | 269/21 |
| 4,476,162 | 10/1984 | Ireland | 427/164 |
| 4,544,572 | 10/1985 | Sandvig et al. | 427/44 |
| 4,550,679 | 11/1985 | Pipa et al. | 118/326 |
| 4,603,867 | 8/1986 | Babb et al. | 279/3 |
| 4,758,448 | 7/1988 | Sandvig et al. | 427/54.1 |
| 4,791,261 | 12/1988 | Phinney et al. | 118/620 |
| 4,823,735 | 4/1989 | Pichel et al. | 118/641 |
| 4,827,867 | 5/1989 | Takai et al. | 118/326 |

*Primary Examiner*—Willard Hoag
*Attorney, Agent, or Firm*—Lyon & Lyon

[57] ABSTRACT

A spin coater suitable for spin coating spectacle lens molds with polymerizable coating composition. The spin coater includes a drawer which rotatably mounts at least one chuck thereon, which drawer is slidable between a front and rear position within a housing to sequentially allow application of a coating by the spinning chucks in the front chamber of the housing, followed by polymerization thereof in the rear chamber. Each chuck of the spin coater is provided with a mold seat defined by a ledge and adjacent lip, the lip automatically centering the mold in the seat axis by virtue of its dimensions in relation to the mold. The chuck also has a lengthwise resilient vacuum conduit, preferably in the form of a bellows, which has an open end which can sealingly engage against a seated mold, such that when a vacuum is applied through the vacuum conduit the mold is urged firmly against the ledge of the mold seat. A method of producing a coated spectacle lens, preferably using such a spin coater, involves providing two different abrasion resistant coatings on front and rear molding surfaces of a form, which coatings are only partially polymerized. The form is then filled with resin which is cured and the coated formed lens is separated from the form. The coatings on the lens are then preferably further polymerized by exposure to actinic light.

8 Claims, 7 Drawing Sheets

SPIN COATER

FIELD OF THE INVENTION

This invention relates to a spin coater, and components thereof, which can coat spectacle lens molds then used to produce coated spectacle lenses, and abrasion resistant coated spectacle lenses.

TECHNOLOGY REVIEW

Historically, spectacle lenses were prepared from glass blanks which were ground in each case to meet the required prescription. More recently, it has been known to prepare plastic spectacle lenses by polymerizing organic monomeric compounds in a suitable spectacle lens form. Previously used monomeric compounds include allyl diglycol carbonate in a form designated by the trade name CR-39, which is polymerized by isopropyl percarbonate. Such a monomeric compound, and the manufacture of a spectacle lens using such a compound, are described in U.S. Pat. Nos. 2,542,386 to Beattle, and 4,251,474 to Blandin.

One type of form which has been previously used, is assembled from a gasket into which could be seated in spaced apart, opposed relation, two molds with inwardly facing molding surfaces. The molding surfaces would define the front and back surfaces of the resulting lens. The monomeric resin would then be introduced into the cavity between the molds, and cured, typically be heat treatment. Such a method and apparatus for producing finished cast lenses, are disclosed in U.S. Pat. No. 2,964,501 to Sarofeen, U.S. Pat. No. 3,070,846 to Schrier, U.S. Pat. Nos. 4,251,474 and 2,193,742, among others.

It is desirable to provide coatings on lenses such as those produced by the above broadly described method. In particular, it is desirable to provide abrasion resistant coatings on the cured lens, since cured resins such as CR-39 exhibit a relatively low abrasion resistance. In order to produce a coated lens by the above method, the molds are coated with a suitable polymerizeable composition prior to their being seated in the gasket. Various techniques for coating the molds have been previously suggested. For example, U.S. Pat. No. 3,978,178 to Oshima discloses spraying, brushing, flowing or dropping a coating onto molds. U.S. Pat. No. 4,544,572 to Sandvig et al., additionally mentions coating the molding surfaces by spin coating. However, no examples or details of a spin coating procedure are provided. U.S. Pat. No. 3,971,872 to LeBoeuf discusses spin coating a lens with an abrasion resistant coating but provides no details as to how such spin coating is accomplished.

In practice, spectacle lenses themselves have been spin coated with a polymerizeable composition, which is then polymerized to form an abrasion resistant coating. However, such technique involved using adhesive tape, or some similar means to attach the lens to be coated to a spin coater chuck, after the operator has visually ascertained whether the lens was approximately centered on the chuck. Of course, failure to center the lens may result in uneven coating during the spin coating procedure. Such uneven coating is often undesirable. However, even when uneven coating may be desired, the foregoing technique broadly failed to provide any means for accurately positioning the lens in relation to the axis of rotation of the chuck.

Spin coater apparatus, specifically intended for the coating of lenses, has been described in various patents. U.S. Pat. No. 4,476,162 to Ireland discloses an apparatus for coating a lens for blocking purposes. The foregoing apparatus uses a rotating flexible plastic, or the like, suction cup upon which the lens is disposed. U.S. Pat. No. 4,164,099 to Grant discloses a contact lens holder using a vacuum to retain the contact lens in position on a rotatably mounted, yieldable shaft. In the apparatus of both the Ireland and Grant patents, no means appear to be provided for centering, or accurately positioning, the lens with respect to the axis about which it is to be rotated. In addition, in each case the flexible cup or yieldable shaft is the only means of supporting the lens in position, there being no additional support in the event that the shaft does not yield equally in all radial directions under application of vacuum therethrough. A failure to yield radially symmetrically in such a case, of course, could result in further error in the positioning of the lens with respect to the axis about which it is to be rotated.

Spin coaters adapted for purposes unrelated to the art of spectacle lens coatings, are also known. For example, U.S. Pat. No. 4,347,302 to Gotman discloses a spin coater apparatus for coating a thin layer of material such as a semi-conductor chip substrate. The substrate is held in position on a rotating turntable, using a vacuum. U.S. Pat. No. 4,603,867 to Badd et al. discloses a vacuum spinner chuck for holding an electronic substrate in position thereon, involving use of an O-ring seal. U.S. Pat. Nos. 3,426,727 to Balain et al. and 3,538,883 to Polin, relate to rotary vacuum chucks apparently primarily intended for electronic substrates. However, there is apparently no means provided in the apparatus of the foregoing patents, for centering the substrate on the rotating chuck. Further, the vacuum conduits in each case are formed in apparently rigid materials.

Other patents have disclosed the use of a vacuum to simply retain various elements in a fixed position, including optical lenses, without any arrangement for rotating the retained elements. These patents include, U.S. Pat. No. 3,794,314 to Coburn et al., which discloses a lens block using a vacuum, and a seal to be interposed between the block and the lens. U.S. Pat. No. 4,357,006 to Hayes discloses vacuum clamps for holding various work pieces in a fixed position. Such clamps use of a deformable seal, or alternatively consist of a bellows.

Thus, although vacuum chucks for holding lenses and other items are known, such prior chucks apparently do not provide any means for centering a lens or lens mold on the chuck, or otherwise ensuring that it is accurately positioned with relation to the axis about which it is to be rotated. Such prior chucks further apparently do not provide any additional means for supporting a lens or lens mold, when the member upon which it mounts is flexible or resilient, and might not yield radially symmetrically about its lengthwise axis. Thus, prior lens holding chucks both fail to prevent an operator from placing the lens thereon in an incorrect position with respect to the axis of rotation, and, even should the lens be initially mounted correctly, do not provide a means for insuring that the lens remains in such position in the cases where the lens holding element is yieldable.

With regard to abrasion resistant coatings themselves, many suitable coating compositions are known in the art. For example, many suitable coating compositions, such as various acrylates, are discussed in the following U.S. Patents, namely U.S. Pat. No. 3,978,178 to Oshima, U.S. Pat. No. 4,306,954 to Wendling, U.S. Pat. No. 3,968,305 to Oshima, U.S. Pat. No. 3,265,763 to Deichert, and U.S. Pat. No. 4,287,227 to Kamada et al. Oshima '178 also discloses coating molds with a suitable coating composition, then polymerizing the composition to a specified degree by exposure to ultraviolet light, and filling the mold with resin which is then cured to produce the finished cast article. The patent indicates that the abrasion resistant coating would then be polymerized to a further degree. However, there is apparently nothing in this patent which indicates other than that if both surfaces of the lens are to be coated, that they should each be coated with the same composition and preferably with the highest possible abrasion resistance on each surface. Further, there is nothing in the foregoing patent that suggests that equally abrasion resistant coatings on both the front and back surface of the lens, might be disadvantageous under certain circumstances.

SUMMARY OF THE INVENTION

The present invention then, provides a spin coater suitable for spin coating a spectacle lens in a relatively convenient, efficient manner with relatively little operator intervention. The spin coater uses a drawer mounted within a housing, and slidable between distinct front and rear chambers thereof. The drawer carries at least one, and preferably a plurality, of spin coater chucks of the present invention rotatably mounted thereon. This arrangement allows molds to be seated on the chucks when the drawer is in the front position, and spin coated, and allows them to be exposed to actinic light when the drawer is in the rear position. In order to control the exposure time of molds to the actinic light, while avoiding on/off cycling the actinic light source each time the drawer is moved between the front and rear position, a shutter is disposed between the actinic light fixture and the rear position of the drawer. The shutter is preferably operated by slidable movement of the drawer.

The spin coater chuck of the present invention is arranged to center the mold within a seat on the chuck defined by a ledge and adjacent lip, thus obviating the need for inaccurate centering by eye. Of course, although the mold is disposed centrally on the seat, this does not necessarily mean that the mold is centered about an axis of rotation of a chuck, although this will typically be the case, as in some cases it may be desirable to spin coat the mold by spinning it in an off-centered position about an axis of rotation of the chuck. To retain the mold in the seated position on the chuck, a lengthwise resilient vacuum conduit, preferably in the form of a bellows, is provided. This conduit has an open end which can sealingly engage against a seated spectacle lens molds and urge it toward the ledge so as to inhibit unseating of the mold during spinning of the chuck. This resilient conduit is preferably in the form of a bellows.

The present invention also provides a method for preparing a spectacle lens having a first surface, typically the front surface, with a coating which is relatively highly abrasion resistant, and a second surface which also has an abrasion resistant coating but with a degree of abrasion resistance substantially less than that of the first surface, such that the second surface remains "tintable" while the first surface is not. By the word "tintable" used throughout this application in reference to a lens coating, is meant that the coating can be tinted by exposure to an aqueous solution containing 5% (by weight) in total of one or more azo anthraquinone water soluble pigments such that the solution will produce a red, green, blue or grey tint, in combination with 0.2% (by weight) of a surfactant, for ten minutes at 200° F., such that there is at least a decrease of 5% in total visible light transmission through the coated lens.

The coated lens is produced by the method of the present invention in such a manner that both front and back coatings have a high degree of adhesion to the lens. This preferably is accomplished by using coating compositions with different "solids" content (i.e. the concentration of the polymerizeable compound in the composition is different) for the front and back molds, and only partially polymerizing the coatings. The coatings are polymerized sufficiently such that they do not dissolve in lens resin while the resin is being cured, but not overly polymerized, such that the coatings can be partially absorbed on the resin and cross-linked therewith, during resin curing. Over polymerization would result in poor adhesion of the final coating (that is, after any post-curing step) to the cured lens resin. By "poor adhesion" is meant the resulting coating would have on adhesion of less than or equal to Class IB as determined by American Society of Testing Materials ("ASTM") adhesion tape test D 3359-83, Method B. Resin is then introduced to the form and cured, followed by separation of the resulting lens from the form, additional polymerization of the coatings, and by tinting if desired.

A spectacle lens produced by such a method is also disclosed. The coatings of such a lens will be "partially absorbed" on the cured lens resin and cross-linked therewith, unlike coatings which may be applied after the lens resin has cured and would typically only be adsorbed on the surface of such cured lens resin.

DRAWINGS

Embodiments of the invention will now be described with reference to the drawings in which.

DETAIL DESCRIPTION OF EMBODIMENTS OF THE INVENTION

In order to more fully appreciate the application of the present invention, a spectacle lens forming workstation which uses components of the present invention, will first be described. A spin coater of the present application, and the novel chucks thereof, will then be described, with particular reference to FIGS. 2-5. Following this, a description of the method of the present invention for producing a lens coated with an abrasion resistant coating on front and back surfaces thereof, and the resulting lens, will be provided.

Spectacle Lens Forming Workstation

Figure 1:
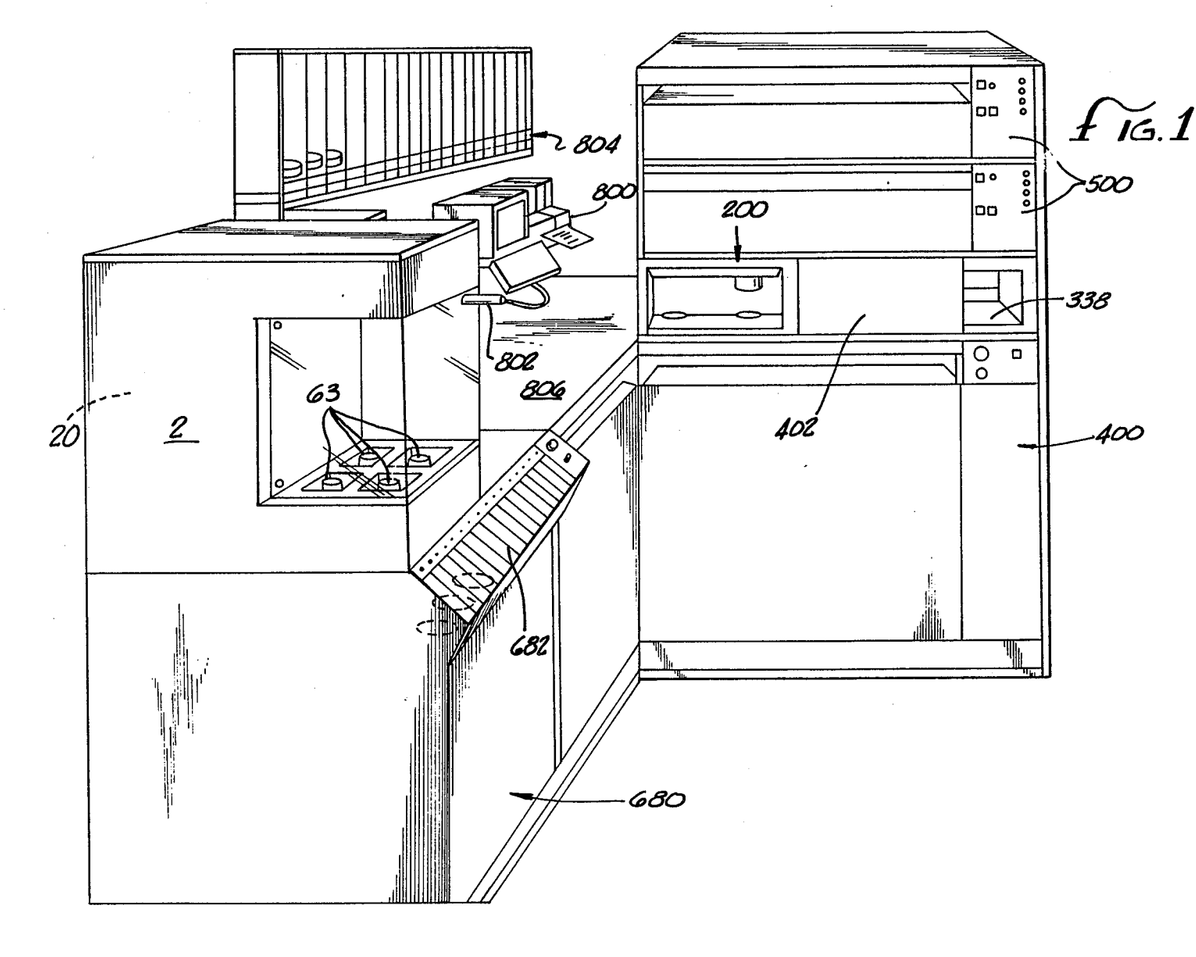
FIG. 1 is a perspective view of a spectacle lens assembly work station which utilizes components of the present invention as integral parts thereof.
Figure 2:
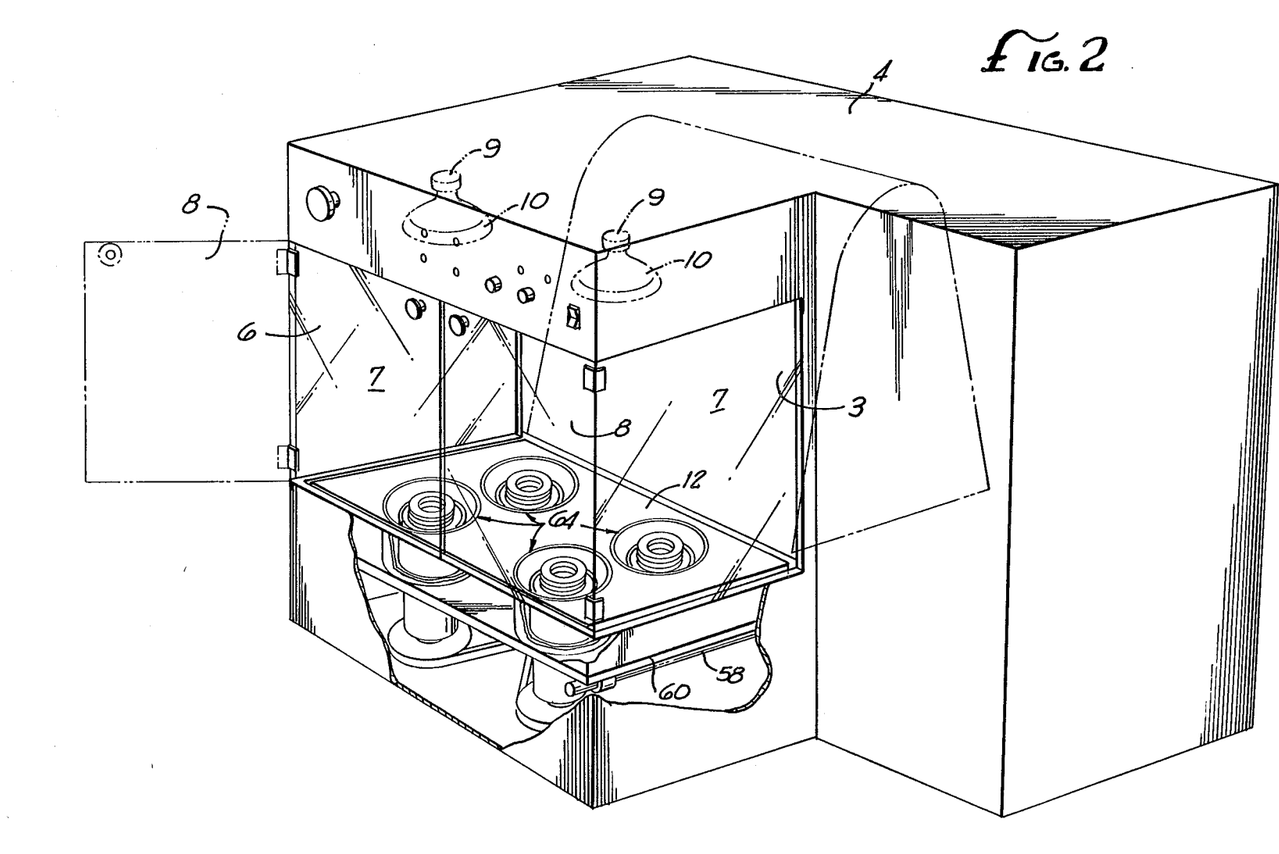
FIG. 2 is a perspective, partially cut away view of a spin coater of the present invention viewed toward a front thereof, with a drawer of the spin coater being in a front position.

The lens forming workstation shown in FIG. 1, is described in detail, in co-pending U.S. patent application entitled "Lens Casting Apparatus" by Kachel et al., Ser. No. 07/114,364 filed on the same date as the present application. This lens forming station is arranged for operation with minimal operator intervention. Mounted thereabove is a gasket dispenser 804 for dispensing gaskets of a type such as those described in detail in U.S. patent application entitled "Lens Forming Apparatus", by Kachel et al., Ser. No. 114,312, filed on the same date as the present application. Likewise, a mold holder and dispenser 680, which is described in more detail in co-pending U.S. application entitled "Spectacle Lens Mold Storage Apparatus", by Kachel et al., Ser. No. 07/113,857, filed on the same date as the present application, stores a plurality of different molds therein, any one of which can be dispensed at dispensing door 682. A counter 806 is provided as a working space, upon which the selected gasket and molds can be identified using scanner 802 connected to a computer 800. The molds can be spin coated with a monomeric coating, such as a coating which is abrasion resistant when polymerized, in spin coater 2, which is described in more detail below. A rear compartment 20 contains an actinic light source which can polymerize the monomeric coating which is spin coated on the molds.

A spectacle lens form assembly apparatus 200, which is also described in detail in copending U.S. patent application entitled "Lens Forming Apparatus", supra, receives both the chosen gasket and coated molds, in a manner which is described in detail in that application, and assembles them to produce a form. Form assembly apparatus 200 includes a form filling station which receives a form so assembled, and fills it with premixed resin pumped from storage in a refrigerator 400. The filling station is disposed in a cooled housing 402, cooled by means of a fan (not shown) which circulates cold air from refrigerator 400 into housing 402. The resin dispenser mechanism within refrigerator 400 is also more fully described in copending U.S. patent application entitled "Lens Casting Apparatus", supra. A form accumulator 338 of the form assembly apparatus 200, receives filled forms from the resin injection station. Two ovens 500 are disposed above the form assembly apparatus.

Briefly, the operation of the overall lens forming system is as follows. The operator enters the lens prescription in computer 800 and is directed to select for each lens, a gasket and two molds suitable for the prescription, from gasket dispenser 804 and mold dispenser 680, respectively. The molds can be seated on spin coater chucks 63 of spin coater 2, and spin coated therein if desired, typically with a monomeric polymerizable coating. Spin coater chucks 63, with the molds still retained thereon, are then moved to rear chamber 20, where they are exposed to a suitable dose of actinic light, in order to partially polymerize the coating. When chucks 63 are again moved to the position shown in FIG. 1, the coated molds can be removed therefrom. The operator then positions the coated molds and gasket in a form assembly apparatus 200, in a manner described in more detail in copending U.S. patent application entitled "Lens Forming Apparatus", supra, which assembles the form from them, fills the form with resin, and deposits filled forms on accumulator 338.

The operator can then remove the filled forms from accumulator 338, and place them within either of two ovens 500, which are controlled for suitable curing cycles. Following curing of the resin, the form can be disassembled, the gasket typically disposed of, and the molds returned to mold retaining and dispensing apparatus 680. If desired, the lenses may be returned to chucks 63 of spin coater 2, which are then moved to rear chamber 20 in order to expose the partially polymerized coatings, to a further suitable dose of actinic light, and thereby completely polymerize them to a degree which provide suitable abrasion resistance.

Having thus described the overall lens forming station, the invention of the present application, will now be described.

Spin Coater

Referring particularly to FIGS. 2-5, spin coater 2 consists of a housing 4 having front and rear chambers 6, 20, respectively, separated by wall 9. Front chamber 6 has two opposed sides 7 and two hingely mounted doors 8 (one of which is shown in an open position in broken lines in FIG. 2), each of which is made of a transparent plastic which has been darkened to reduce light transmission therethrough, such that chamber 6 is only visible therethrough when it is strongly illuminated. A plate 12, having four circular openings 14 therein, defines another wall of front chamber 6. Two infrared light fixtures 9 are capable of receiving respective infrared bulbs 10 therein, such that bulbs 10 face in a direction toward plate 12. Fixtures 9 are adapted to receive bulbs 10 which are of a well known threaded base infrared floodlight variety.

Housing 6 further has a rear chamber 20 in which is disposed a metallic reflector 21 with a lower position 24 and a plurality of openings 23 disposed at an upper end thereof. An actinic light fixture, comprised of mounting sockets 26, is disposed in rear chamber 20, and more specifically within an upper end of reflector 21. Sockets 26 are dimensioned to receive an actinic light 28 which is preferably a medium pressure mercury vapor light. Opposed ends of reflector 21 each carry three slots, 30, 32 and 34 which act as guides for a shutter 36.

Specifically, shutter 36 consists of two rectangular sheets 38, 40 which are hingedly mounted about a hinge 42 extending in a sideways direction of housing 4. Shutter 36 is movable between a closed position, best seen in FIG. 4, and an open position, best seen in FIG. 5, by virtue of guides 44 extending from hinge 42, guides 46 extending from an end of sheet 38, and guides 48 extending from sheet 40, sliding within respective slots 34, 30 and 32. Shutter 36 is moved between the open and closed positions by means of a shutter trigger, consisting of an arm 52 which is an extension of guide 48, and resilient spring 54 connected therefrom to a rear position 61 of a sliding drawer 60. It will be seen from FIGS. 4 and 5 that when shutter 36 is in the open position, sheets 38,40 are spaced apart at an "interior angle" (that is the smallest angle between the two sheets 38, 40) which is less than the interior angle when they are in the open position shown in FIG. 4. Thus, in the open position of shutter 36 sheets 38, 40 are spaced apart at an interior angle greater than when shutter 36 (and hence each of sheets 38, 40) is in its closed position.

An alternative arrangement for the trigger, would be such that each of sheets 38, 40 could be individually controlled thereby for movement to their open and closed positions.

Drawer 60 is slidably mounted on two rails 58, which are in turn mounted within a lower end of housing 4. This permits drawer 60 to slide between a front position best shown in FIGS. 2 and 4, and a rear position best shown in FIGS. 3 and 5. This movement is accomplished by a pneumatic cylinder (not shown), controlled by an external control switch.

Drawer 60 carries four spin coater elements 62 each having a spin coater chuck 63 (described in more detail below), rotatably mounted on drawer 60 by means of a hollow shaft 80. Chucks 63 are positioned on drawer 60 such that they are in alignment with respective openings 14 in plate 12 and thus can be illuminated by infrared lights 10 when drawer 60 is in the front position, and can be illuminated by actinic light 28 mounted in sockets 26, when drawer 60 is in the rear position and shutter 36 is open. Under the alternative arrangement for the trigger of shutter 36, mentioned above, individual control of sheets 38, 40 would allow timed exposure of the rearward most two of chucks 63 to actinic light 28, to be different from that for the two forwardmost of chucks 63. This could be particularly advantageous where, as described in the Example below, the exposure time of back molds is greater than that required for the front molds.

Figure 4:
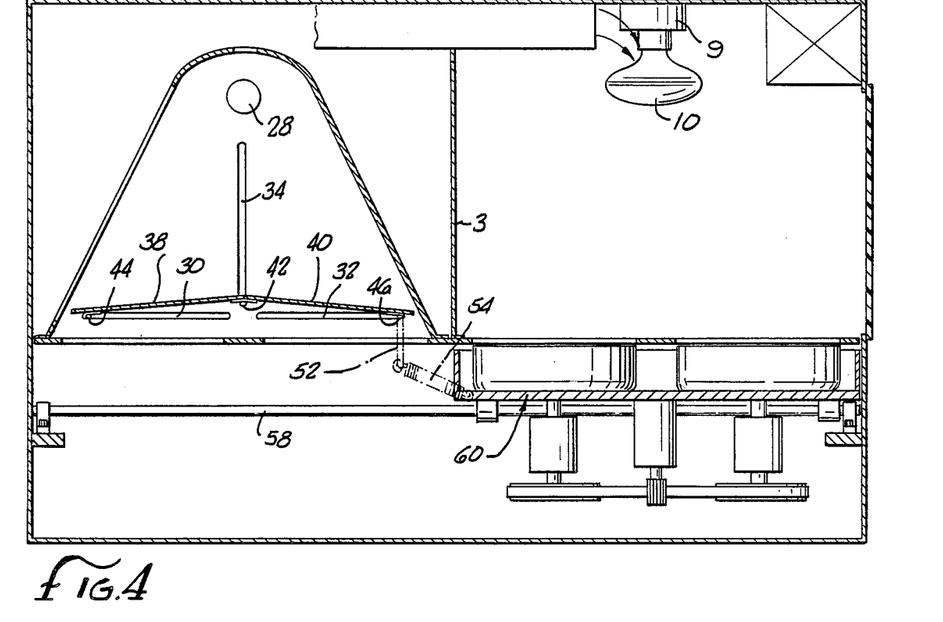
FIG. 4 is a cross-section of the spin coater showing the drawer in the front position.
Figure 5:
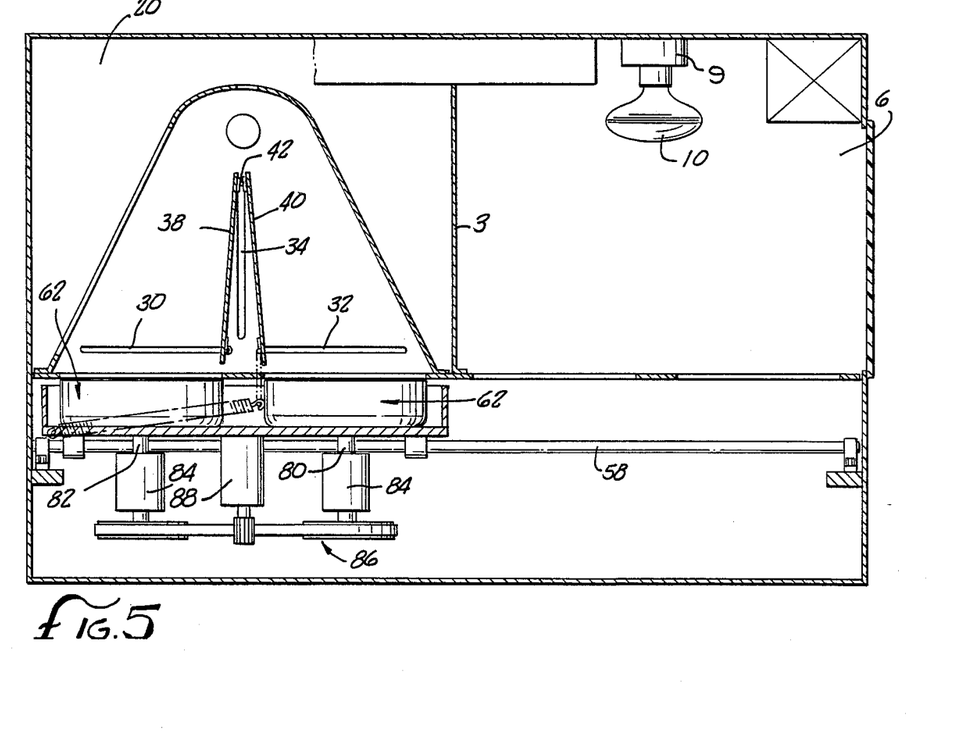
FIG. 5 is a view similar to FIG. 4, but showing the drawer in the rear position.

It will be seen particularly from FIGS. 4 and 5, that the movement of drawer 60 on rails 58, opens and closes shutter 36. In particular, arm 52 and spring 54 are selected such that drawer 60 will open shutter 36 relatively rapidly (i.e. will tend to "snap" it open) as drawer 60 passes through a position adjacent to its rear position while being slid rearwardly. Such an adjacent or "trigger" position would be located at a point approximately when drawer 60 is two-thirds within rear housing 20. Likewise, drawer 60 will tend to snap shutter 36 closed as it slides forwardly through such trigger position. It should be noted that drawer 60 is preferably slid on rails 58 between the front and rear positions, by means of a pneumatic motor (not shown) disposed within housing 4.

Figure 6:
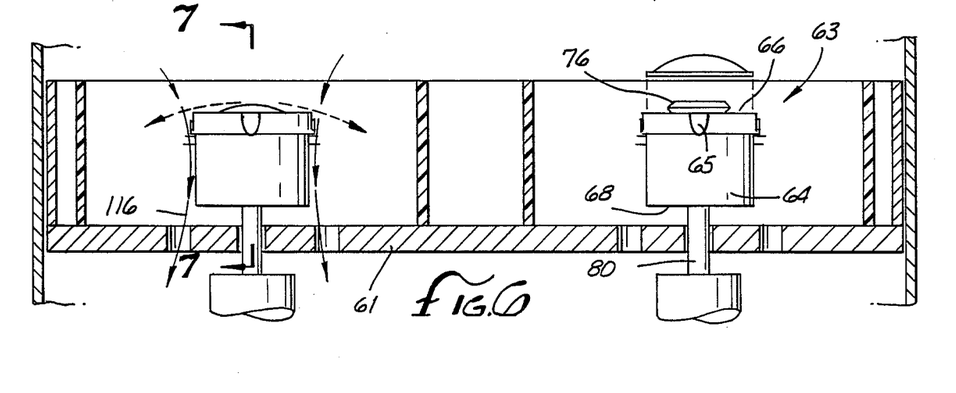
FIG. 6 is a cross-section of a portion of the drawer of the spin coater, showing two spin coater chucks of the present invention, both with and without a spectacle lens mold seated thereon.
Figures 7, 8, 9:
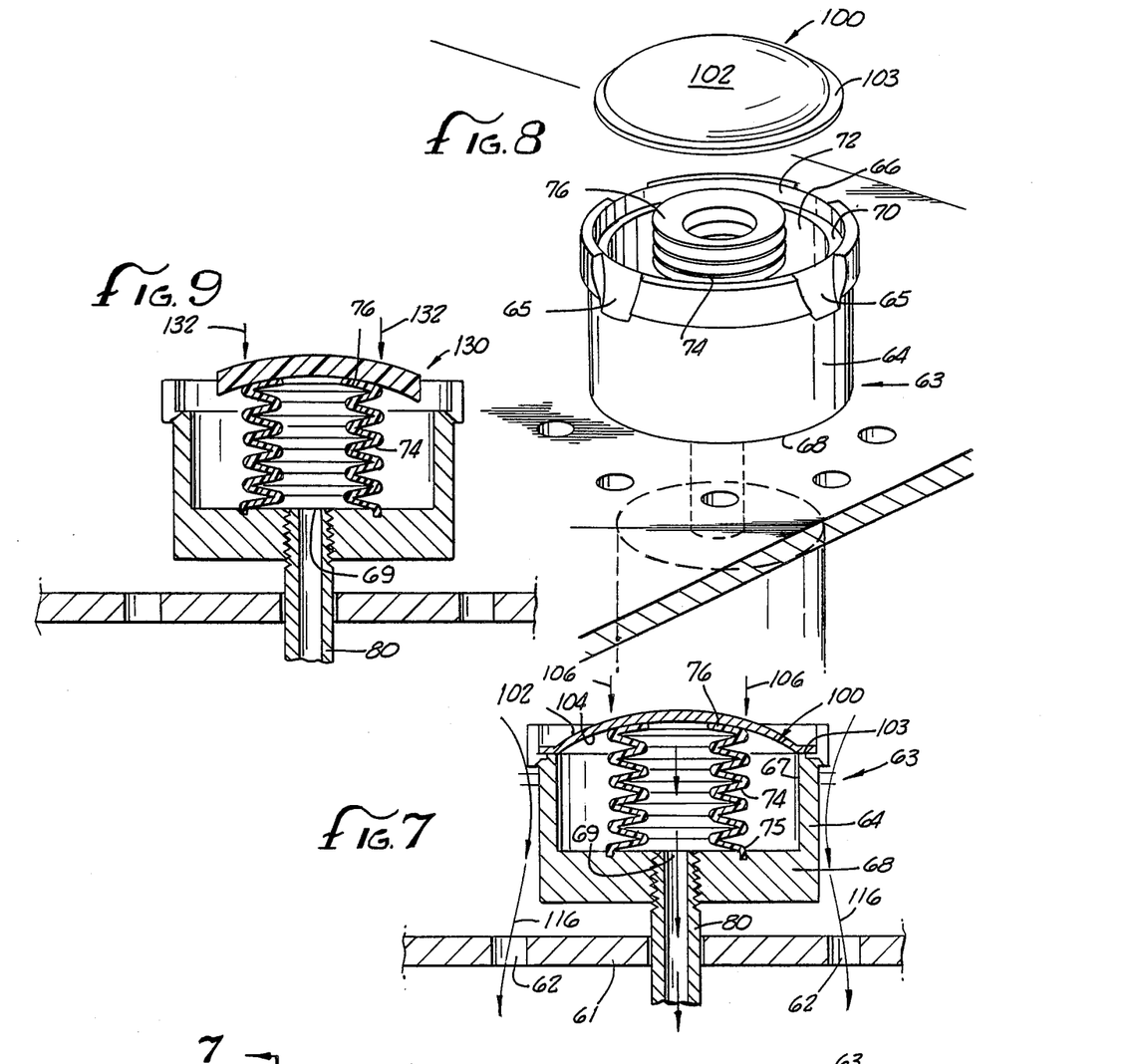
FIG. 7 is a cross-section along the lines 7—7 of FIG. 6.
FIG. 8 is a perspective view of a spin coater chuck of the type shown in FIG. 6, with a spectacle lens mold in position for mounting thereon.
FIG. 9 is a view similar to FIG. 7 but showing a spectacle lens seated on the spin coater chuck.

Returning to the construction of each of chucks 63, it will be seen that each has a generally cylindrical body 64 with an open first end 66, a second end 68, and a generally cylindrical inside surface 67 extending between the ends. Finger grip recesses 65 are provided at upper end 66, while lower end 68 of body 63 is provided with a vacuum opening 69 aligned with the axis of body 63, and which is threaded to receive a matingly threaded, hollow shaft 80. A mold seat is disposed adjacent open upper end 70, the mold seat being defined by an annular ledge 70, and an outwardly adjacent annular lip 72, both of which extend about a mold seat axis which is coaxial with the axis of cylindrical body 64 and is coaxial with the rotational axis of the chuck 63 when rotated by shaft 80. It will be noted that lip 72 projects in a first axial direction, or upward as viewed in the drawings. Likewise, a bellows 74, which is resilient in its lengthwise direction, extends in the first axial direction toward an open first end 76 of bellows 74. A second end 75 of bellows 74 is sealingly engaged with second end 68 of chuck body 64. Bellows 74 will act as a vacuum conduit which is resilient in its lengthwise direction. In addition, the interior of bellows 74 communicates with the interior of hollow shaft 80 through vacuum opening 69.

Again, as previously mentioned, each chuck 63 is mounted for rotation by shaft 80 which, in operation of the spin coater, would communicate by means of an appropriate conduit with an external vacuum pump (not shown). Shafts 80 are rotatable by respective pneumatic motors 84, interconnected by means of a drive belt 86 which also rotates a shaft of sensor 88 to measure the speed of rotation of motors 84, and provide a speed indicating signal to a control apparatus which can control the amount of air delivered to motors 84.

Figure 3:
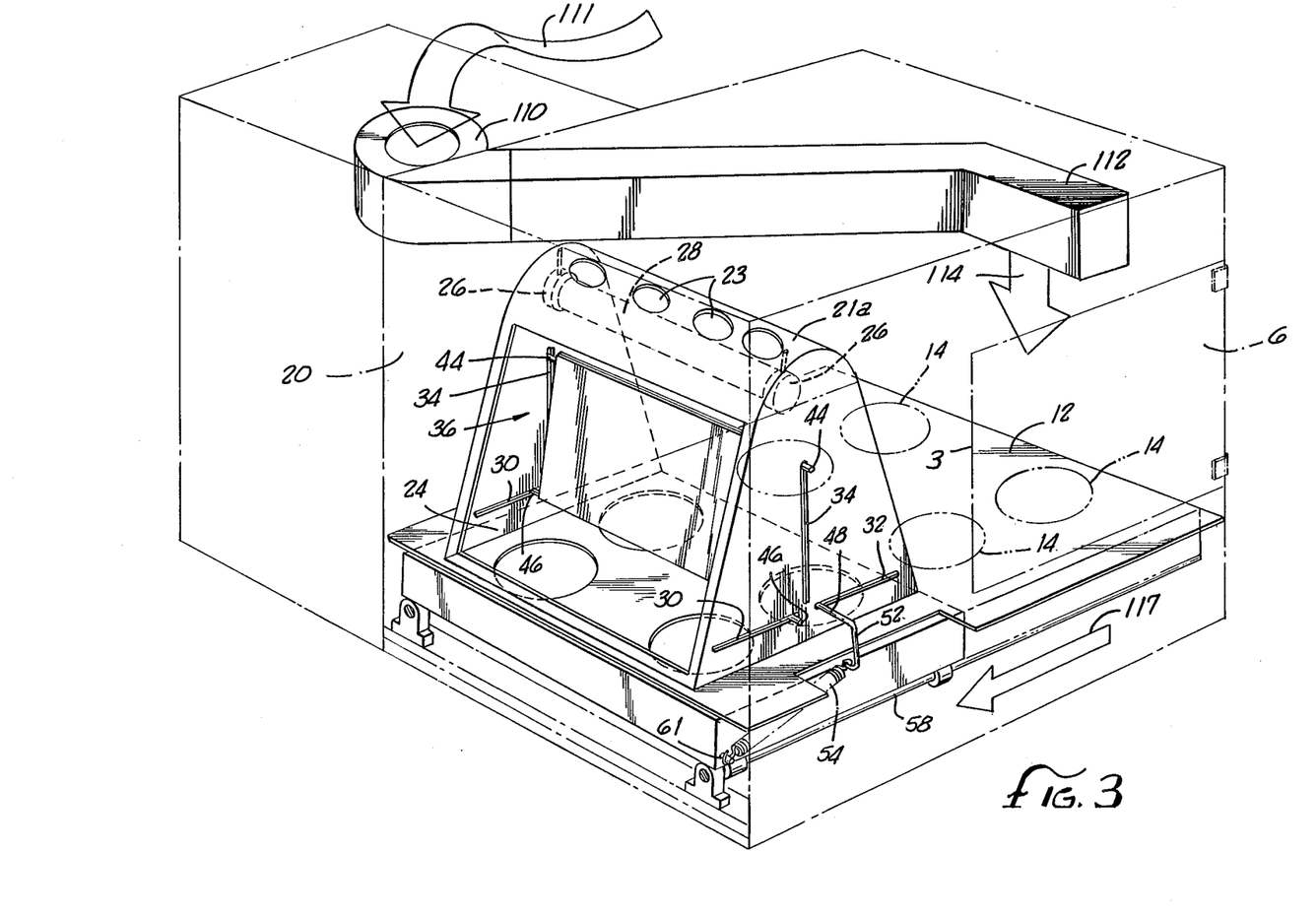
FIG. 3 is a view similar to FIG. 2, but viewed toward a rear of the spin coater, and showing the drawer in a rear position.

A fan 110 is mounted in housing 4 to draw air into housing 4 in the direction of arrow 111, and circulate it therethrough in the direction of arrows, 111, 112, 113, 114, 116 and 117 (as best seen in FIGS. 3, 6 and 7), and hence through a filter (not shown) in the rearwardmost wall of housing 4.

Operation of Spin Coater

First, drawer 60 is slid by its associated pneumatic cylinder (not shown) on rails 58 to its front position, if not already in such position. Fan 110 is turned on to circulate air in the manner already described. The four molds which have been selected for the particular spectacle prescription (two front molds and two back molds) are seated on respective chucks 63. Preferably two of chucks 63 closest to rear chamber 20 are used for the back molds, and the other two chucks 63 are used for the front molds, in order to minimize subsequent incorrect matching of the molds. Likewise, the left two chucks 63 as viewed from doors 8 of front chamber 6, would be used for the front and back molds of the left lens, and the right two chucks 63 used for the front and back molds of the right lens of the spectacle prescription.

Each mold is seated on its corresponding chuck 63 in a manner similar to that disclosed in FIGS. 6-8, which particularly shows seating of a back mold 100. Back mold 100 is simply placed onto ledge 70 of the mold seat with lip 72 thereof accomplishing automatic centering of back mold 100 on the mold seat. Thus, in the spin coater of the drawings, back mold 100 is automatically centered on the axis about which chuck 63 will be rotated by shaft 80. Due to the resilient nature of bellows 74, the operator may find some resistance in pushing mold 100 all the way down onto ledge 70. However, this will be unnecessary since simultaneously with the operator positioning mold 100 above the mold seat and in contact with first open end 76 of bellows 74, an external valve (not shown) is also activated by the operator, preferably by means of foot switch activated by the operator, and the signal therefrom being directed by an appropriately programmed computer; to cause a vacuum through hollow shaft 80 and bellows 74. As open end 76 of bellows 74 will sealingly engage against mold 100, the vacuum within bellows 74 will increase tending to clamp bellows 74 against mold 100, and at the same time pull mold 100 down to a position where it is urged firmly against ledge 70 and retained there. It will be noted that in the case of the front molds, the molding surface will be on the concave side thereof, so that the front molds will be placed with their convex side facing downward. The axial resiliency of bellows 74 can accommodate the then downwardly extending (as viewed in the drawings) convex face of the front mold.

A small amount of a polymerizable coating composition (typically an abrasion resistant coating composition), which is to form a coating on a finished lens, is sprayed on a central area of the molding surface of each mold. Examples of abrasion resistant polymerizable coating compositions are provided below, however use of the spin coater of the present invention is not restricted to such compositions. Further, U.S. Pat. No. 3,978,178 to Oshima, U.S. Pat. No. 4,287,227 to Kamada et al., and U.S. Pat. No. 3,265,763 to Deichert, and U.S. Pat. No. 4,306,954 Wendling, summarize many well known abrasion resistant compounds of a type which might be used in the practice of the present novel method.

At this point, chuck 63 will then be spun at a high rotational rate, typically about 750 revolutions per minute ("rpm"), while infrared light fixtures 8, and hence infrared bulbs 10, are energized typically for about one minute. When infrared lights are each 250 watts, this will be sufficient time to remove most of the coating composition solvent by evaporation.

Drawer 60 is then slid to its rear position by means of the pneumatic piston (not shown), again preferably automatically by means of a control such as a computer control, which insures that the proper time for spin coating has elapsed. As drawer 60 moves rearwardly past the trigger position, shutter 36 is snapped relatively quickly from its closed position in FIG. 4 to its open position in FIG. 5. This arrangement allows medium pressure mercury vapor light 28 disposed in actinic light fixture sockets 26, to remain on constantly and thereby avoid a warm-up period each time drawer 60 is moved into the rear position, while allowing for a relatively precise timing of the exposure of the coated molds to actinic light from light 28. When sufficient time has elapsed, usually about 4–10 seconds, drawer 60 is then slid in a forward direction to its front position, and while passing through the trigger position will snap shutter 36 relatively quickly into its closed position.

Figure 10:
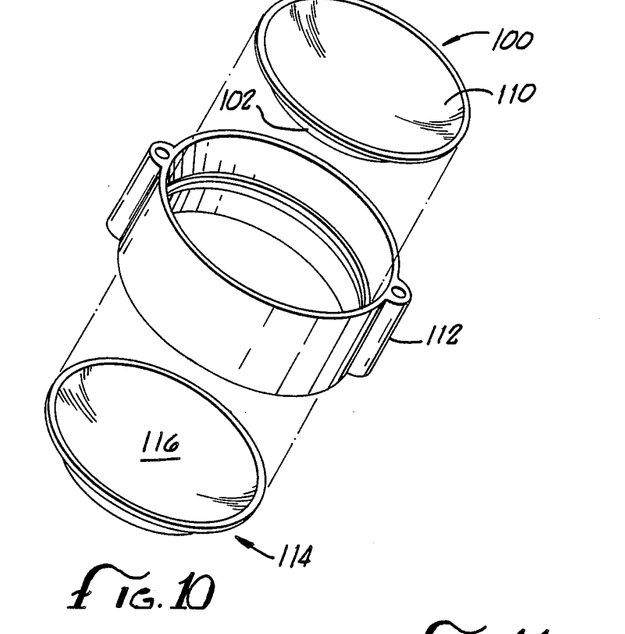
FIG. 10 is a perspective view of a gasket and two molds in position to be assembled into a lens form, used to make a lens of the present invention.

When drawer 60 is again in its front position, the molds with their partially polymerized coating thereon, can be removed from their respective spin coater chucks 63 and inserted into a gasket 112 in a manner shown in FIG. 9, to produce an assembled form as shown in FIG. 10. Assembly of the form is more fully described in copending U.S. Patent Application entitled "Lens Forming Apparatus" supra. A cavity 120 is then filled with resin which is then cured, again as described in the foregoing application, and a resulting lens 130 shown in FIG. 12, separated from the remainder of the form. Since the coatings on molding surfaces 102, 116 of respective molds 100, 114, were only partially polymerized by actinic light 28, they tend to become partially absorbed on the curing resin in cavity 120, and crosslinked with the resin. This fact additionally insures that the partially polymerized coatings on molding surfaces 102, 116 will tend to adhere better to the cured lens than to their respective molding surfaces, and thus facilitate ready separation of the cured lens and its coatings thereon, from molds 100, 114. However, it will be understood that the coatings on molding surfaces 102, 116 should only be cured to an extent which will allow the foregoing partial absorption into the lens forming resin, and thus permit such ready separation from the molding surfaces 102, 116.

Figure 11:
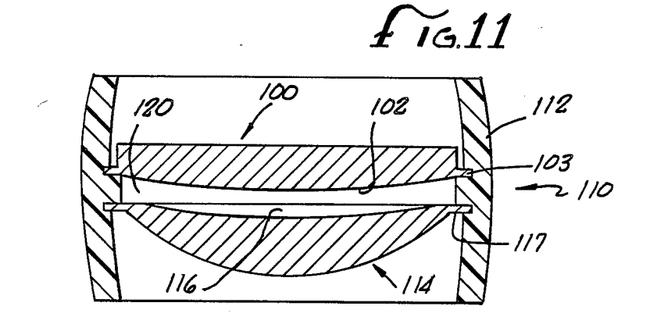
FIG. 11 is a cross-section through a form assembled from the gasket and molds shown in FIG. 10.

Each resulting lens 130 then, as shown in FIG. 11 has a lens body 132 of the cured lens resin, and a front coating 134 and back coating 136. Where desired, the two lenses 130 can be placed upon respective spin coaters 63 in a manner shown in FIG. 9, with only a vacuum through bellows 74 holding each in place. Thus, as shown in FIG. 9, lens 130 will be urged in the direction of arrows !32. Since the lens produced by the molds will have a diameter less then the outer diameter of the molds themselves, it will not seat on the mold seat defined by ledge and lip 70, 72, respectively. However, the purpose of seating the coated lenses on spin coater 63 at this stage does not require spinning of the coater, which instead simply act as holders for lenses 130 while drawer 60 is slid to its rear position, to further expose lenses 130 to actinic light from light 28 and thereby further polymerize and harden coatings 134, 136.

A method which can use such spin coater (but which need not necessarily do so) to produce a spectacle lens with front and back coatings with desirable properties, and the resulting spectacle lens, will now be described.

Method of Making Coated Spectacle Lenses

As described in the "Summary of the Invention" above, the concept here is to provide a first surface of a spectacle lens, preferably the front surface, with a highly abrasion resistant non-tintable coating, while providing a second surface, preferably the rear surface, also with a coating which is abrasion resistant but not to the same degree as the first surface coating, and which is tintable. Preferably the front surface has an abrasion resistance of at least 80 psi as measured by the method described below, and more preferably at least 200 psi, while the back surface preferably has an abrasion resistance of at least about 10 psi. It should be noted that typically coatings with an abrasion resistance of less than about 75 psi, as determined by the method described below, are typically tintable, whereas those with a higher abrasion resistance typically are not.

In the following example, the front and back surfaces of the resultant coated lens have the following characteristics:

Front surface:
abrasion resistance of 275 psi (pounds per square inch), measured by the test method and associated apparatus described below, and non-tintable.

Back surface:
abrasion resistance of approximately 10 psi, measured as above (standard Allyl Diglycol carbonate lenses show approximately 5 psi abrasion resistance).

tintability: 70–80% transmission within 5 minutes at 200° F., and 63–67% transmission within 20 minutes at 200° F., using BPI GRAY (available from Brain Power Incorporated - Miami, Fl., U.S.A. - which is an aqueous solution of a mixture of azo anthraquinone dyes of approximately 5% (by weight)+0.2% of a non-ionic surfactant.

Example 1

Front coating is prepared by adding the following materials in order:

| (sealed and stored at −5° F. until used.) | |
|---|---|
| 63.10 | gram methy ethyl ketone (reagent grade) |
| 1.40 | gram 2,2-dimethoxy-1,2-diphenylethanone (MWT 256.3) |
| 30.80 | gram dipentaerythritol pentaacrylate (MWT 525) |
| 4.20 | gram ethoxylated trimethylolpropane (MWT 428) |
| 0.50 | gram FC-430 (a trade mark of 3M Company - St. Paul, Minnesota, U.S.A.) surfactant (non-ionic fluorinated alkyl esters) |
| 100.00 | grams total |

Back coating is prepared by adding the following materials in order:

| (sealed and stored at −5° F. until used.) | |
|---|---|
| 93.81 | gram methy ethyl ketone (reagent grade) |
| 0.40 | gram 2,2-dimethoxy-1,2-diphenylethanone (MWT 256.3) |
| 2.00 | gram dipentaerythritol pentaacrylate (MWT 525) |
| 0.50 | gram Polyethylene Glycol Dimethacrylate (MWT 300) |
| 2.50 | gram Hydroxypropyl Methacrylate (MWT 144) |
| 0.79 | gram FC-430 surfactant |
| 100.00 | grams total |

PROCEDURE 1.1 Clean front molds are spin coated with the above front coating mix (mix allowed to warm to room temperature before application), at 750 RPM.

1.2 Solvent is evaporated with a 250 watt infrared bulb at a distance of 12 inches for 1 minute, while being spun at 750 RPM.

1.3 The coated front mold is rotated at approximately 38 RPM while exposing to ultraviolet U.V. light ("U.V.") using a medium pressure mercury vapor light for 4 seconds at 19.6 milliwatts per square centimeter measured at 360 nanometer wave length.

1.4 The back mold is coated with the back coating (allowed to warm to room temperature) and solvent evaporated as per 3.1.2 above, and exposed to U.V. as per 1.3 for 10 seconds.

1.5 The mold halves are assembled into a clear polyvinyl chloride gasket having a shore "A" hardness of 75.

1.6 The mold assembly is then filled thru fill ports in the gasket with the coating resin, a mixture of Allyl Diglycol Carbonate, 3% Isoperoxy Percarbonate (IPP) with shrink reduction additives.

1.7 The filled assembly is cured in a horizontal flow forced air oven for 15 hours. Temperature starts at 105° F. and ramps to 145° F.

1.8 After 15 hours the mold assemblies are cooled to 125° F., then demolded.

1.9 The resultant lens are wiped clean with acetone and soft tissue, then placed back in oven for post cure for 30 minutes at 200° F.

1.10 The post cured lenses are then exposed to the U.V.; 60 seconds for front surface and 20 seconds for back surface.

1.11 Abrasion tests are performed on the front surface by the method described below.

1.12 Abrasion resistance of the back coating was estimated by coating a front surface with back coating and performing the abrasion test, RESULTS: 10 PSI 1.13 Tinting test
Standard water soluble
BPI gray dye at 200° F.,
5 minutes - 70–80% transmission to visible light; and
20 minutes - 63–67% transmission to visible light 1.14 Adhesion Test A razor blade was used to cross cut 1/16" squares on a ½"×½" total area, then the cross hatched area was pressed with adhesive tape and was then peeled off. The lens sample is then placed in a tint bath for 5 minutes. Adhesion loss is observed on front or back lens as tinted areas. This test is equivalent to ASTM Adhesion Tape Test No. D 3359-83, method B. The coatings met standard 4B of the foregoing test, that is with virtually no loss of adhesion.

Abrasion Resistance Test Method

Figure 12:
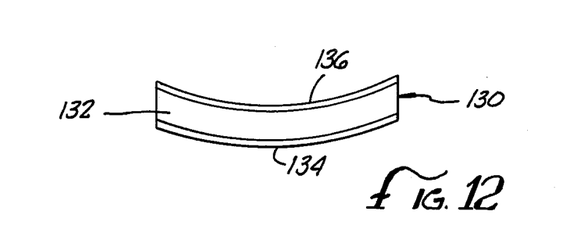
FIG. 12 is a cross-section through a lens of the present invention as produced from the form shown in FIG. 10.

The apparatus for measuring abrasion resistance is shown schematically in FIG. 12, and does not constitute a part of the present invention. This apparatus includes a cam 2 which is driven by a motor (not shown) so as to reciprocate a sample support 6 about a pivot point 8 in the direction of arrows 12. A sample 10, in the form of a coated lens, would be placed upon sample support 6 in the manner shown in FIG. 12. A steel wool pad 14 is arranged to contact the reciprocating sample 10 on sample support 6, and be pressed thereagainst by means of a load (i.e., weight) 20 acting through load transfer rod 18, and maintained in positioned by load transfer guide 16. Load transfer rod 18 has a lower end with approximately 0.5 inch diameter, such that the area of applied pressure to a sample is approximately 0.196 square inch.

Figure 13:
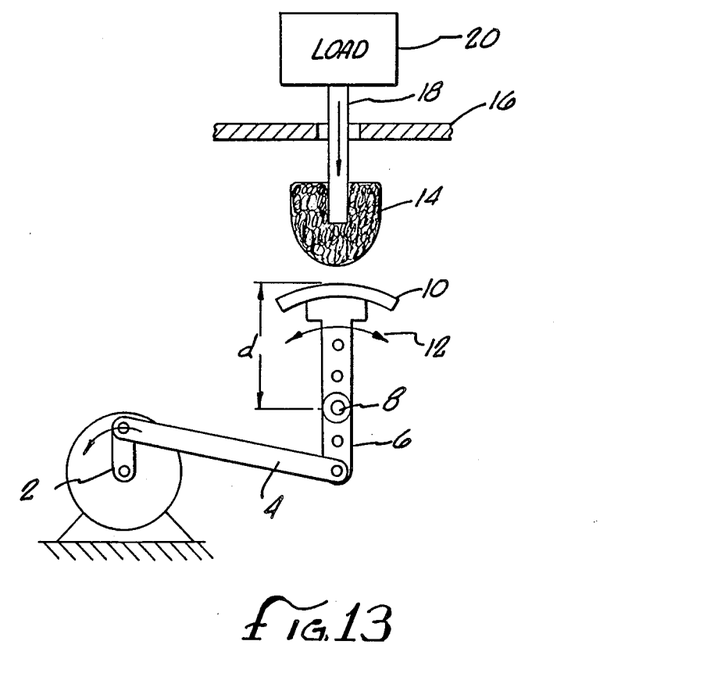
FIG. 13 is a diagrammatic view of an apparatus which is not itself part of the present invention, but was used to ascertain the abrasion resistance ratings of coated spectacle lens of the present invention.

The foregoing apparatus is set up for measuring abrasion resistance as follows:

2.1 The sample support is adjusted to move the sample on the convex plane by proper radius selection at the pivot point for the sample support. For example, a 6.00 Diopter ("D") surface d in FIG. 13 will be:

$$d = \frac{530 \text{ radius}}{(6.00) \times (25.4/\text{inch})} = 3.47 \text{ inch radius}$$

Preferably a 4 to 6 D lens is used for the test, and this should remain constant to reduce error in making comparisons between tests.

2.2 The stroke is set for 1.00 inch by the eccentric cam position. The stroke speed of about one stroke per second is controlled by selection of motor speed. One stroke is 2 passes across the surface.

2.3 The steel wool abrading pad is fine grade (#000) 3×4 inch, with a compressed thickness of 0.25 inches. The steel wool is wrapped around the end on the load transfer rod, the steel wool strands perpendicular to the direction of sample motion, and held tight with tape around the rod.

2.4 The lens sample is positioned on the sample support with two sided tape, the front sample surface is wiped clean with an acetone and a soft tissue wipe.

2.5 The load transfer rod, with weights are allowed to rest freely on the lens sample surface.

2.6 The motor is turned on and 25 strokes are counted by a cycle counter device attached to a motor cam. The motor stops automatically at the end of 25 strokes.

2.7 The load is lifted away, the lens sample removed, wiped clean with acetone/soft tissue, then visually inspected.

2.8 The visual inspection of the lens sample is performed with the unaided eye, viewing thru the back surface, held 8–12 inches from the eye, viewing toward a ceiling mounted fluorescent light. The number of visible continuous ¼ inch, or longer scratches, within the center most ½ inch of the stroke path are counted.

2.9 A sample having 6 or more scratches constitutes failure to exhibit abrasion resistance at a psi value which is corresponds to the weight of load 20. Less than 5 scratches is said to exhibit abrasion resistance at such psi value.

SUMMARY

It will be seen then, that the present invention provides both a spin coater which can conveniently spin coat spectacle lens molds to provide a means for coating a formed spectacle lens, and further provides a novel vacuum chuck for automatically centering the mold in a chuck seat and retaining it in position thereon by means of an axially resilient vacuum conduit. In addition, as has also been disclosed, the present invention provides a method for producing a coated spectacle lens with one surface which is highly abrasion resistant, and another surface which is not so abrasion resistant but has fairly significant abrasion resistance, and which other surface remains tintable whereas the more abrasion resistant surface is not. Further, both coatings are partially absorbed onto the lens forming material itself, and therefore adhere firmly thereto, by virtue of the fact that the coatings were only partially polymerized when positioned in a form and contacted with the uncured lens forming resin. In addition, the present invention also provides a lens which can be produced by the foregoing method.

We claim:

1. A spin coater comprising:
   (a) a housing having separate front and rear chambers separated such that light in the rear chamber is substantially blocked from the front chamber;
   (b) a drawer carrying at least one spin coater element each of which is suitable for spin coating a spectacle lens mold, said drawer being slideably mounted within said housing to move between front and rear positions in which the spin coater is disposed in the front and rear chambers, respectively.

2. A spin coater as defined in claim 1, additionally comprising an actinic light fixture disposed in the rear chamber, so that an actinic light disposed therein can illuminate each spin coater element when said drawer is in the rear position.

3. A spin coater as defined in claim 2 additionally comprising:
   (a) a shutter disposed in the rear housing between said light fixture and the rear position of said drawer, said shutter being moveable between a closed position in which the rear position of the drawer is shielded from the light fixture, and an open position;
   (b) a shutter trigger connected between said shutter and said drawer, so as to open and close said shutter, in response to said drawer moving rearwardly into, and forwardly out of, the rear position, respectively.

4. A spin coater as defined in claim 1, additionally comprising an actinic light fixture disposed in the rear chamber, so that an actinic light mounted in said fixture can illuminate each spin coater element when said drawer is in the rear position.

5. A spin coater as defined in claim 3 wherein said shutter comprises two sheets hinged together in a sideways direction of said housing and mounted to be forwardly and rearwardly pivotable about the hinge, between open and closed positions, corresponding to open and closed positions of the shutter, respectively, in which open position the sheets are spaced apart at an interior angle greater than when in their closed position.

6. A spin coater as defined in claim 4 wherein said shutter trigger comprises a resilient member connected between said drawer and said shutter, so as to open and close said shutter when said drawer moves rearwardly and forwardly, respectively, of a position adjacent the rear position.

7. A spin coater as defined in claim 6 additionally comprising a reflector disposed in the rear chamber, and within which reflector said actinic light fixture is disposed such that said reflector directs light from said fixture to the spin coater elements when said drawer is in the rear position.

8. A spin coater as defined in claim 6 wherein said shutter is mounted in said reflector by means of guides on the sheets which ride in corresponding slots in the reflector.

* * * * *

UNITED STATES PATENT AND TRADEMARK OFFICE
CERTIFICATE OF CORRECTION

PATENT NO. : 4,895,102

DATED : January 23, 1990

INVENTOR(S) : THEODORE V. KACHEL, Pittsburgh, PA, et al.

It is certified that error appears in the above-identified patent and that said Letters Patent is hereby corrected as shown below:

Column 4, line 26, should not start a new paragraph on line 26 since "("ASTM")" is part of sentence on line 25.

Column 13, lines 12 and 13, should not begin new paragraphs but should be part of the sentence on lines 10 and 11.

Column 14, lines 21-25, delete "4. A spin coater" to "is in the rear position"; line 34, cancel the claim reference numeral "4", and replace with --3--.

Signed and Sealed this

Sixth Day of August, 1991

Attest:

HARRY F. MANBECK, JR.

Attesting Officer

Commissioner of Patents and Trademarks